United States Patent [19]
Cho

[11] Patent Number: 5,959,373
[45] Date of Patent: Sep. 28, 1999

[54] LINEAR MOTOR

[75] Inventor: Kil H Cho, Changwon, Rep. of Korea

[73] Assignee: LG Industrial Systems Co., Ltd., Seoul, Rep. of Korea

[21] Appl. No.: 08/971,724

[22] Filed: Nov. 17, 1997

[30] Foreign Application Priority Data

Nov. 19, 1996 [KR] Rep. of Korea ............. 96/55295
Nov. 19, 1996 [KR] Rep. of Korea ............. 96/55296

[51] Int. Cl.[6] .................................................. H02K 41/00
[52] U.S. Cl. ................................................ 310/12; 318/135
[58] Field of Search ................................ 310/12, 13, 14; 318/135

[56] References Cited

U.S. PATENT DOCUMENTS 5,179,304  1/1993  Kenjo et al. .................. 310/12
5,300,846  4/1994  Miller .......................... 310/12

FOREIGN PATENT DOCUMENTS 61-24258  6/1986  Japan .

*Primary Examiner*—Thomas M. Dougherty
*Assistant Examiner*—Judson H. Jones
*Attorney, Agent, or Firm*—Oliff & Berridge, PLC

[57] ABSTRACT

A linear motor includes a coil unit, and a movement unit including a magnetic planar body facing against the coil unit, wherein a changeable clearance δ is formed between the magnetic planar body and a plurality of lamination core protrusions in the coil unit, and a nonmagnetic planar body attached onto an upper surface of the magnetic planar body. The linear motor enables a speed control without an electrical current in its applied system such as an elevator, thereby excluding an additional current control system.

22 Claims, 16 Drawing Sheets

LINEAR MOTOR

BACKGROUND OF THE INVENTION

1. Field of the Invention

The present invention relates to a linear motor, and more particularly to an improved linear motor which makes it possible to carry out a speed control without an additional current control system, by appropriately shifting a clearance between a coil unit and a moveable unit, and a magnetic flux area with regard to a relation of the coil unit and the moveable unit.

2. Description of the Background Art

In general, a linear motor is formed of a coil unit and a moveable unit, and includes a link, a chain and other instruments. The linear motor serves to shift a rotational energy to a linear energy.

Such a linear motor becomes further simplified and less heavy, and significantly reduces energy and space required therein, thereby being applicable to a variety of appliances such as conveyer and elevator.

As shown in FIGS. 1A and 1B, in a conventional linear motor 100, a coil unit 9 is provided with a core laminations 12 and a plurality of protrusions 12a. A cylindrical coil unit 11 is formed between the protrusions 12a.

Below the coil unit 9 there is provided a moveable unit 10 which includes a magnetic plate 10a having a plurality of protrusions 10a' thereon and a metallic support plate 10b formed beneath the magnetic plate 10a.

Here, a clearance δ is maintained between the protrusions 12a formed on the lower surface of the core laminations 12 in the coil unit 9 and the protrusions 10a' formed on the upper surface of the moveable unit 10.

In order to constantly maintain the clearance δ, a roller 13 is provided between each end of the support plate 10b of the moveable unit 10 and the core laminations 12 of the coil unit 9.

The thusly constituted conventional linear motor will be described with reference to an elevator system applied thereto.

As shown in FIG. 2, in an elevator body 1 of an elevator system employing the conventional linear motor, respective lower end portions of a left and right side power transfer plates 4, 5 are fixedly connected to corresponding upper portions of left and right doors 2, 3 which serve to open/close the elevator system 1.

A rotation rope 8 that circulates on a pair of auxiliary pulleys 6, 7 formed at each side portion of the elevator body 1 is fixedly connected to an upper portion of each of the power transfer plates 4, 5 so as to horizontally move therealong.

Here, the linear motor 100, the coil unit 9 of which is fixed to a portion of the elevator body 1, supplies a driving power to the left and right power transfer plates 4, 5. The moveable unit 10 of the linear motor 100 is fixed to either of the left and right power transfer plates 4, 5, and faces against the coil unit 9. Also, a predetermined clearance δ is maintained between the plurality of core laminations protrusions 12a of the coil unit 9 and the moveable unit 10.

A current control system 20 is installed at a side portion of the elevator body 1 so as to control a power supply for controlling the doors 2, 3 in connection with the coil unit 9. A rotary encoder 21 connected to the power controller 20 is attached on a shaft of the auxiliary pulley 7 so as to detect a close/open speed of the elevator doors 2, 3.

As shown in FIG. 3, the current control system 20 includes: a power source 22; a converter 23 connected by a diode bridge to the power source 22 and converting the supplied current to a direct current; an inverter 24 composed of a switching device such as a transistor, converting the direct current converted in the converter 23 to a three-phase alternating current having a predetermined frequency, and releasing the converted alternating current to respective wires u, v, w of the core laminations 12 in the linear motor 100; a switching command generator 25 generating a switching command with regard to the left and right doors 2, 3 of the elevator body 1; a detector 26 detecting a location of the moveable unit 10 of the linear motor 100; a magnetic processing unit 27 receiving a signal from the detector 27 and determining the location of the moveable unit 10 of the linear motor 100; a command distributor 28 commanding a magnetization of the respective wires u, v, w of the linear motor 100 in accordance with a signal outputted from the magnetic processing unit 27; an arithmetic unit 29 receiving the respective signals from the switching command generator 25 and the command distributor 28, and obtaining a call order and time in a transistor group of the inverter 24; and a rotary encoder 21 detecting the location of the moveable unit 10 of the linear motor 100.

With reference to FIGS. 1A through 3, the operation steps of the conventional linear motor applied to the elevator body 1 will now be described.

First, when there occurs a door open command after the arrival of the elevator body 1 to a target floor, the current control system 20 supplies an electrical power to the core laminations 12 of the coil unit 9 so that the moveable unit 10 can move from left to right.

Accordingly, the moveable unit 10 moves the to right, and the right power transfer plate 5 moves toward the right side, so that the right door 3 connected to the right power transfer plate 5 moves toward the right side. In accordance with the moveable of the right side door 3, the rotation rope 8 is rotated and accordingly the left power transfer plate 4 moves toward the left side, whereby the left side door 2 is opened.

At this time, the rotary encoder 21 is rotated anticlockwise, and the moveable momentum of the left and right doors 2, 3 is detected, and the signal detected in accordance with the rotary encoder 21 is transferred to the current control system 20, thereby controlling the speed and earthing of the left and right doors 2, 3.

When the left and right doors 2, 3 are completely opened, the power supply from the current control system 20 is interrupted, and the left and right doors 2, 3 are earthed.

The closing operation of the left and right doors 2, 3 is carried out in a reverse order.

However, because the conventional linear motor employs a variable control of the current so as to convert a torque for controlling the door close/open speed of the elevator body, there is inevitably required an additional speed control apparatus, thereby significantly increasing production cost and deteriorating productivity.

SUMMARY OF THE INVENTION

Accordingly, it is an object of the present invention to provide a linear motor which enables a speed control without an electrical current in its applied system such as an elevator, thereby excluding an additional current control system.

To achieve the above-described object, there is provided a linear motor according to the present invention which includes a coil unit, and a moveable unit including a magnetic planar body facing against the coil unit, wherein a changeable clearance δ is formed between the magnetic planar body and a plurality of core laminations protrusions in the coil unit, and a nonmagnetic planar body attached onto an upper surface of the magnetic planar body.

Further, to achieve the above-described object, there is provided a linear motor according to the present invention which includes a coil unit, a moveable unit including a magnetic planar body facing against the coil unit, wherein a changeable magnetic flux area S is formed between the magnetic planar body and a plurality of core laminations protrusions in the coil unit, and a nonmagnetic planar body attached onto an upper surface of the magnetic planar body.

Still further, to achieve the above-described object, there is provided a linear motor according to the present invention which includes a coil unit, a moveable unit including a magnetic planar body facing against the coil unit, wherein a changeable clearance δ is formed between the magnetic planar body and a plurality of core laminations protrusions in the coil unit, and a plurality of nonmagnetic bars each having a predetermined width and being pressed in an upper surface of the magnetic planar body.

Also, to achieve the above-described object, there is provided a linear motor according to the present invention which includes a coil unit, a moveable unit including magnetic circular body, wherein a changeable clearance δ is provided between the magnetic circular body and a plurality of core laminations in the coil unit, and a nonmagnetic body surrounding an outer periphery of the magnetic circular body.

In addition, to achieve the above-described object, there is provided a linear motor according to the present invention which includes a coil unit, a moveable unit including magnetic circular body, wherein a changeable clearance δ is provided between the magnetic circular body and a plurality of core laminations in the coil unit, and a nonmagnetic pipe type body surrounding an outer periphery of the magnetic circular body.

Additionally, to achieve the above-described object, there is provided a linear motor according to the present invention which includes a coil unit, a moveable unit including magnetic circular body, wherein a changeable clearance δ is provided between the magnetic circular body and a plurality of core laminations in the coil unit, and a plurality of nonmagnetic rings respectively pressed in an outer periphery of the magnetic circular body.

Further, to achieve the above-described object, in an elevator system including left and right side power transfer plates fixedly connected to corresponding upper portions of left and right doors of an elevator body, a rotation rope enabling the left and right side power transfer plates to become operational, a pair of pulleys formed at each side portion of the elevator body so that the rotation rope rotates thereon, a coil unit provided at a portion of the elevator body, and a moveable unit provided with a magnetic body and a nonmagnetic body, a linear motor includes the coil unit is fixed to a portion of the elevator body, and the moveable unit is fixed to either of the left and right side power transfer plates.

Still further, to achieve the above-described object, in an elevator system including left and right side power transfer plates fixedly connected to corresponding upper portions of left and right doors of an elevator body, a rotation rope enabling the left and right side power transfer plates to become operational, a pair of pulleys formed at each side portion of the elevator body so that the rotation rope rotates thereon, a coil unit provided at a portion of the elevator body, and a moveable unit provided with a magnetic body and a nonmagnetic body, a linear motor includes the moveable unit is fixed to a portion of the elevator body, and the coil unit is fixed to either of the left and right side power transfer plates.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood from the detailed description given hereinbelow and with reference to the accompanying drawings which are given only by way of illustration and thus are not limitative of the present invention, wherein.

DETAILED DESCRIPTION OF THE INVENTION

Figure 1A:
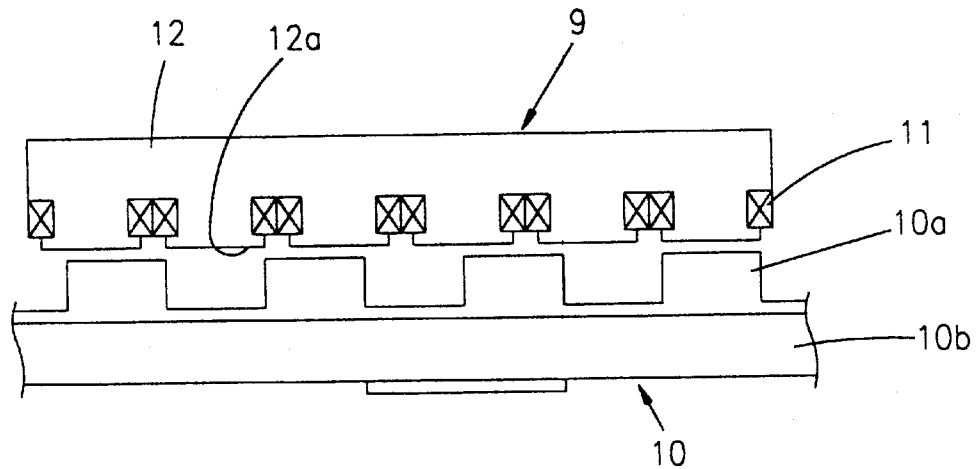
FIG. 1A is a plan view of a conventional linear motor.
Figure 1B:
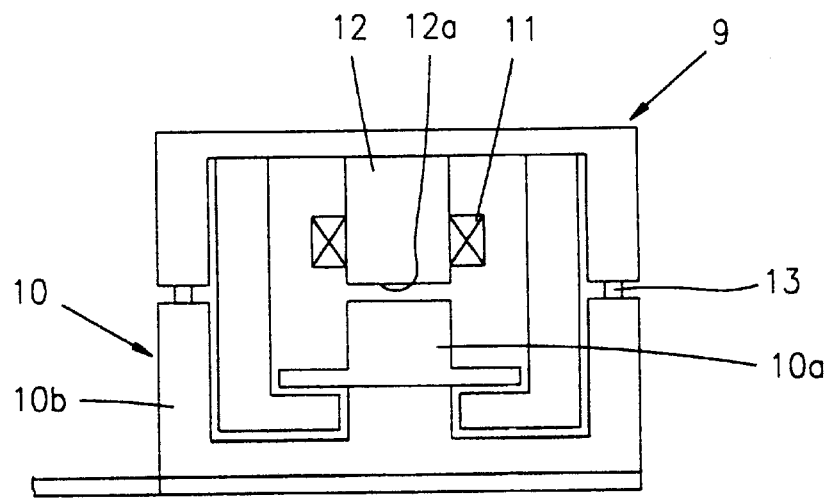
FIG. 1B is a cross-sectional view taken along line $1b$–$1b'$ in FIG. 1A.
Figure 2:
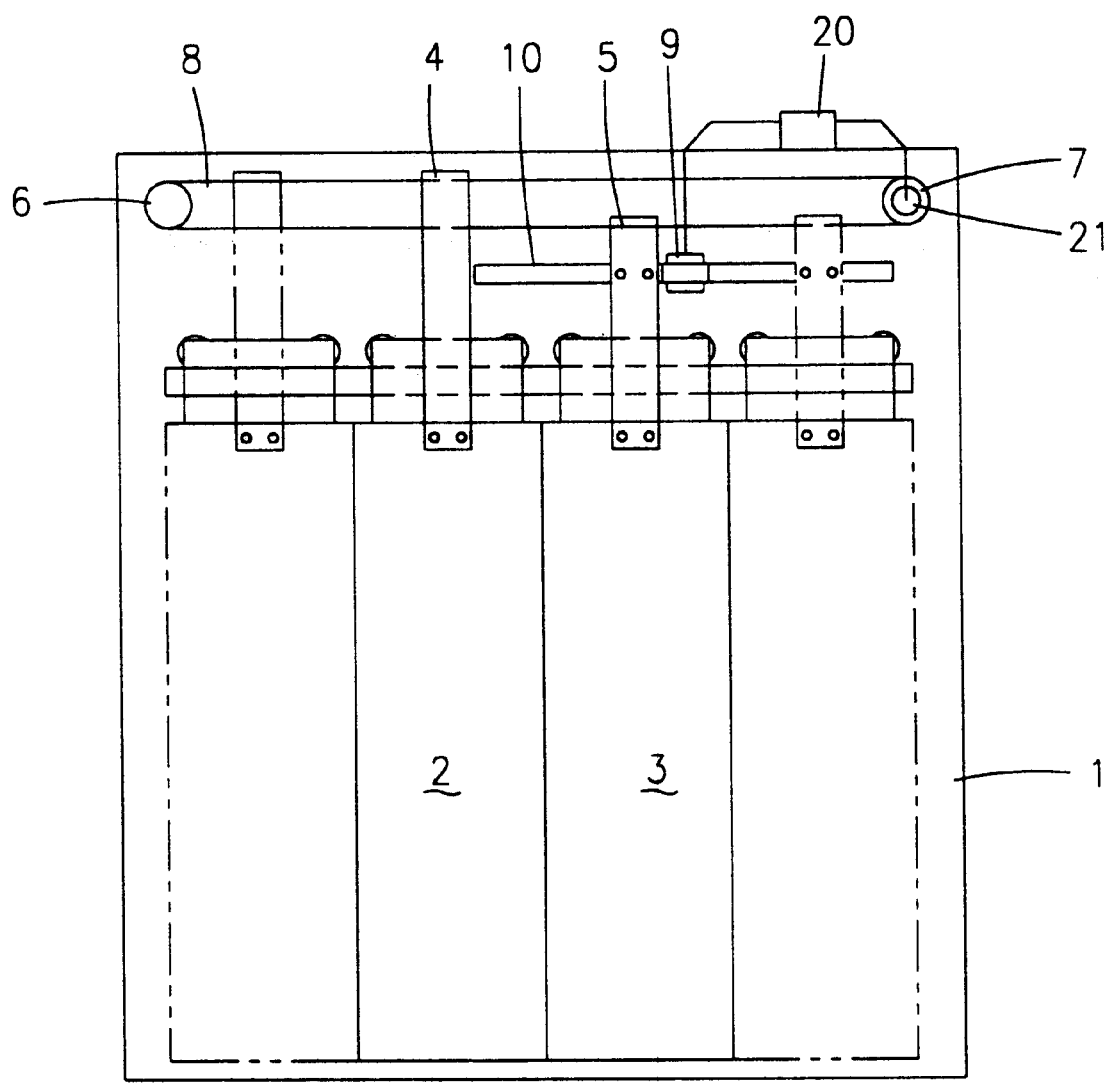
FIG. 2 is a front view of an elevator body including the conventional linear motor.
Figure 3:
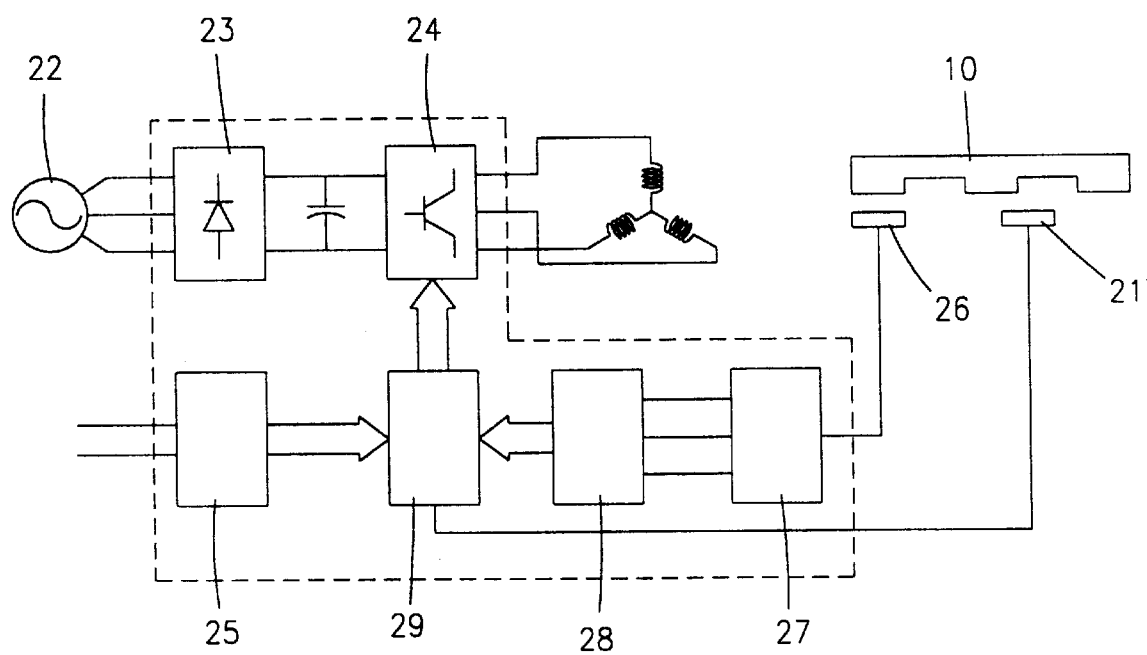
FIG. 3 is a block diagram detailing a current control system of the elevator body including the conventional linear motor.

With reference to the accompanying drawings, the linear motor according to the present invention will now be described. Here, the same reference numerals will be employed with regard to respective portions identical to the convention art.

Figure 4A:
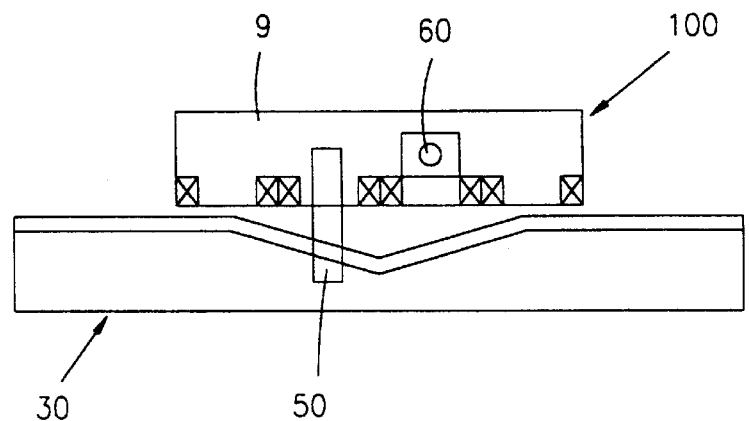
FIG. 4A is a plan view illustrating a linear motor according to the present invention.
Figure 4B:
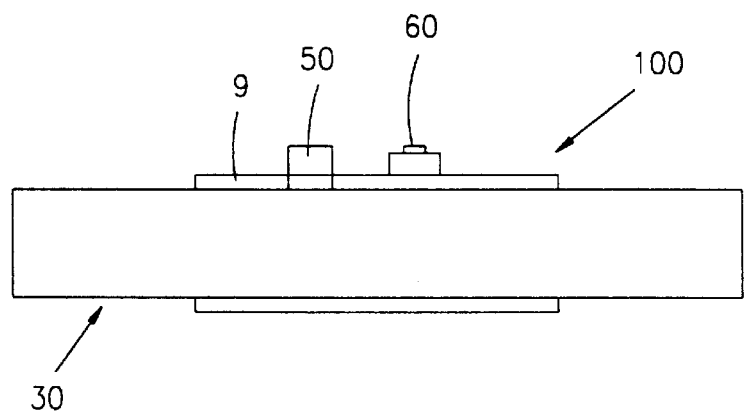
FIG. 4B is a front view illustrating the linear motor according to the present invention.

As shown in FIGS. 4A and 4B, the linear motor 100 includes a coil unit 9 having a limit switch 60 which is fixed to the coil unit 9 and serves to decrease an operational speed of a system employing the linear motor 100, and a moveable unit 30 facing with the coil unit 9 and having a cam 50 which serves to turn on the limit switch 60.

The cam 50 turns on the limit switch 60 as the moveable unit 30 moves to the right side.

Also, a stopper (not shown) is provided at each side portion of the moveable unit 30, thereby regulating a movement position of the moveable unit 30.

Figure 5:
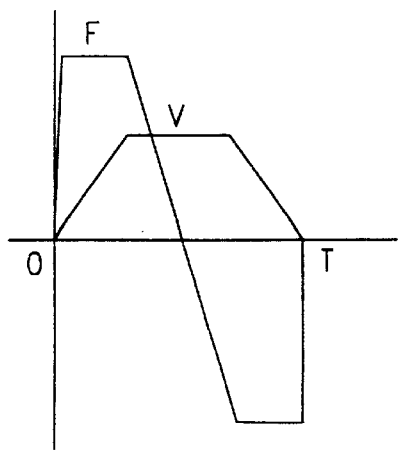
FIG. 5 is a graph illustrating a variation that occurs in accordance with a relationship between an elevator door speed pattern and a motor thrust force, with regard to a variation of the clearance and the magnetic flux area.

As shown in FIG. 5, the linear motor according to the present invention is contrived utilizing the fact that a thrust force of the linear motor 100 is inproportional to a clearance $\delta$ between the coil unit 9 and the moveable body 30, and it is proportional to a magnetic flux area S formed therein in relation with the coil unit 9.

That is, using the initial values of a thickness, a width and a slope of the moveable unit 30 in relation with clearance $\delta$ and magnetic flux area S, there is obtained a required motor thrust force.

Figure 6A:
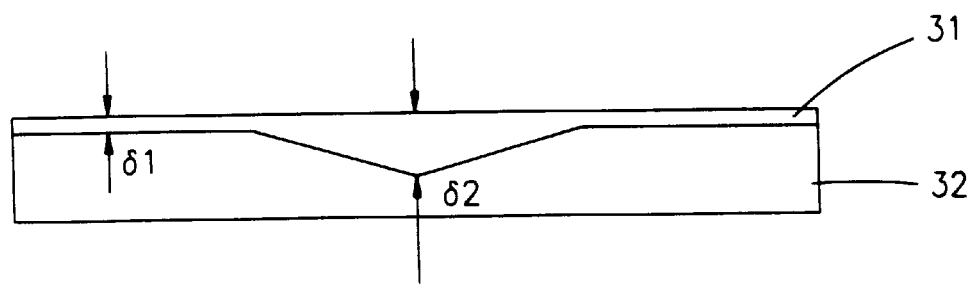
FIG. 6A is a cross-sectional view of a moveable unit for illustrating a clearance magnitude between a magnetic body and a nonmagnetic body in the moveable unit of the linear motor according to the present invention.
Figure 6B:
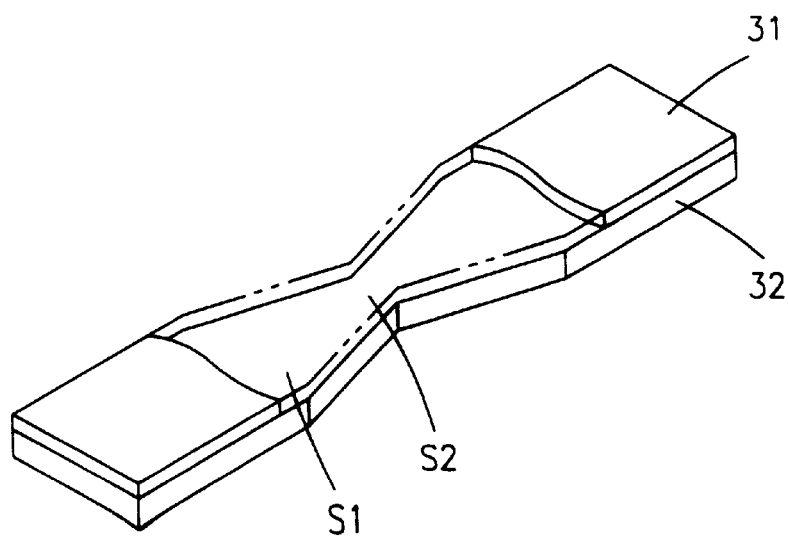
FIG. 6B is a perspective view of a moveable unit for illustrating a magnetic flux area formed by the magnetic body and the nonmagnetic body in the moveable unit of the linear motor according to the present invention.

As shown in FIGS. 6A and 6B, the moveable unit 30 for the linear motor according to the present invention includes a nonmagnetic body 31 formed of a material such as Al, Cu, and a magnetic body 32. Therein, the bodies 31, 32 may vary from flat type to cylindrical type.

The nonmagnetic body 31 and the magnetic body 32 are respectively fabricated with the provision of a predetermined thickness, width and slope which are calculated in relation with clearance $\delta$ between the respective bodies 31, 32 and magnetic flux area S formed therein in relation with the coil unit 9.

The thusly composed moveable unit according to the present invention, as shown in FIGS. 6A and 6B, obtains a desired thrust force for a linear motor, by shifting a difference of measurements $\delta_1, \delta_2$ between the upper surface of the nonmagnetic body 31 and the upper surface of the magnetic body 32 or by shifting a difference of the magnetic flux areas $S_1$, $S_2$ that occur on the magnetic body 32.

The moveable unit for a linear motor according to the preferred embodiments of the present invention will now be described with reference to the accompanying drawings.

Figure 7A:
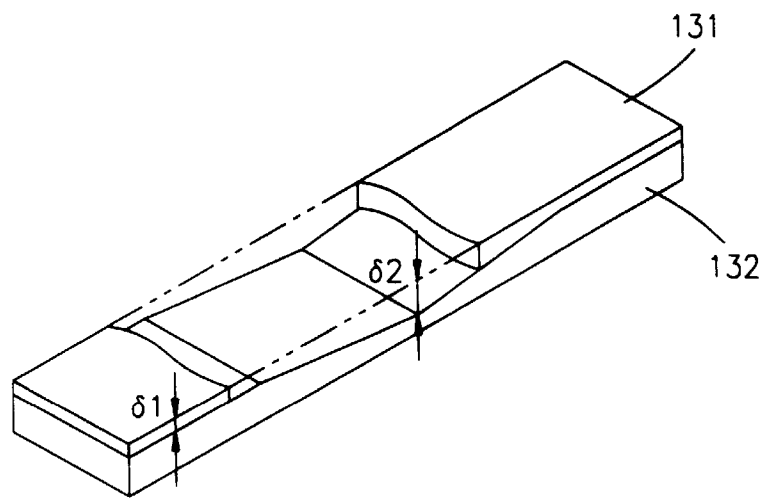
FIG. 7A is a perspective view of a linear motor moveable unit according to a first embodiment of the present invention.

As shown in FIG. 7A illustrating the first embodiment of the moveable unit according to the present invention, the moveable unit 30 includes a nonmagnetic body 131 and a magnetic body 132. The magnetic body 132 becomes gradually thinner from each marginal side thereof toward a central portion thereof so as to have a predetermined slope at the upper surface of the magnetic body 132. The nonmagnetic body 131 is fillingly formed along the indented upper surface of the nonmagnetic body 132.

The moveable unit 30 according to the first embodiment of the present invention employs a difference of measurements $\delta_1, \delta_2$ between the upper surface of the nonmagnetic body 131 and the upper surface of the magnetic body 132, thereby obtaining a desired thrust force for the linear motor.

Figure 7B:
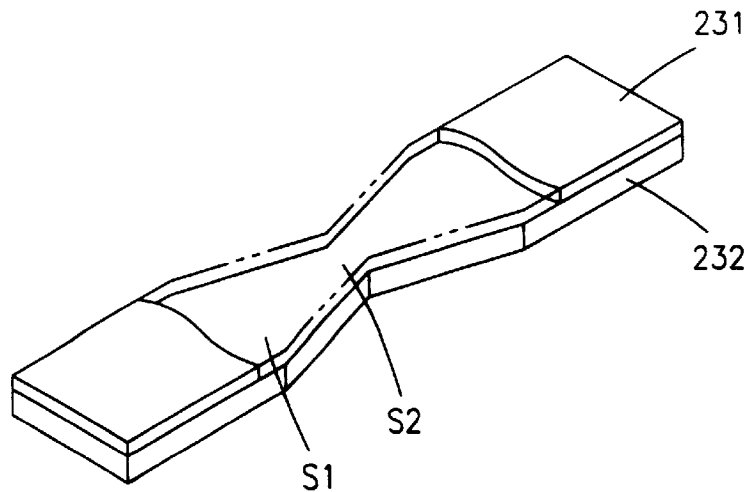
FIG. 7B is a perspective view of a linear motor moveable unit according to a second embodiment of the present invention.

As shown in FIG. 7B illustrating the second embodiment of the moveable unit according to the present invention, the moveable unit 30 includes a nonmagnetic body 231 and a magnetic body 232, wherein respective central portions of a nonmagnetic body 231 and a magnetic body 232 become smaller in width. Then, the nonmagnetic body 231 is correspondingly attached onto the upper surface of the magnetic body 232. The moveable unit 30 according to the second embodiment of the present invention obtains a required thrust force for a linear motor by shifting a magnetic flux area from $S_1$ for the non-indented portion to $S_2$ for the indented portion wherein $S_1$ is larger than $S_2$ ($S_1 > S_2$).

Figure 7C:
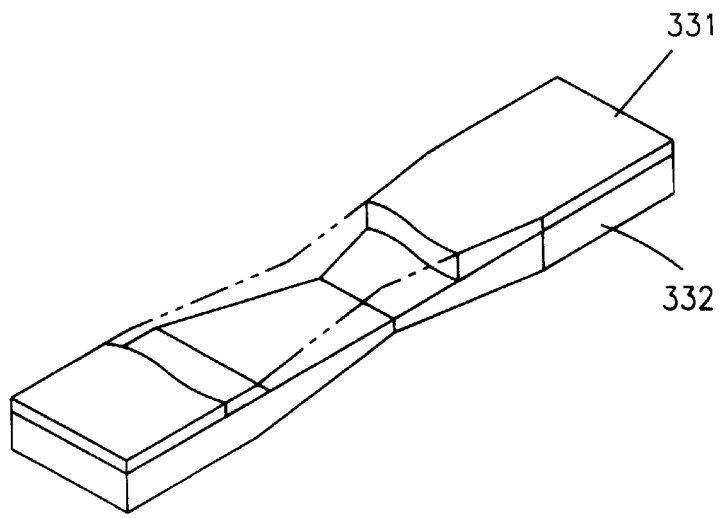
FIG. 7C is a perspective view of a linear motor moveable unit according to a third embodiment of the present invention.

As shown in FIG. 7C illustrating the third embodiment of the moveable unit according to the present invention, the moveable unit 30 includes a nonmagnetic body 331 and a magnetic body 332, wherein the first and second embodiments of the present invention as shown in FIGS. 7A and 7B, respectively, are realized into the third embodiment of the present invention. That is, the upper surface of a central portion of the magnetic body 332 becomes downwardly indented, and the nonmagnetic body 331 is fillingly formed on the magnetic body 332, and then the respective central portions of the nonmagnetic body 331 and the magnetic body 332 become smaller in width.

The moveable unit 30 for the third embodiment of the present invention obtains a required thrust force for a linear motor by shifting a difference of measurements $\delta_1, \delta_2$ respectively measured at the center and the marginal portion and between the upper surface of the nonmagnetic body 331 and the upper surface of the magnetic body 332 and by shifting a magnetic flux area from $S_1$ for the non-indented portion to $S_2$ for the indented portion wherein $S_1$ is larger than $S_2$ ($S_1 > S_2$). Especially, the moveable unit 30 according to the third embodiment of the present invention may be employed when there is required a relatively abrupt thrust force for a linear motor.

Figure 7D:
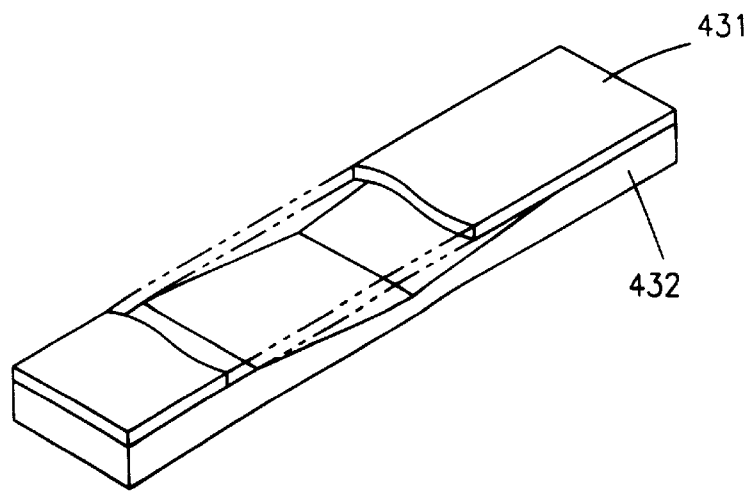
FIG. 7D is a perspective view of a linear motor moveable unit according to a fourth embodiment of the present invention.

Referring to FIG. 7D illustrating the fourth embodiment of the moveable unit according to the present invention, the moveable unit 30 modified from the first embodiment for the convenience of its fabrication includes a nonmagnetic body 431 and a magnetic body 432, wherein the magnetic body 432 becomes smaller toward a central lower portion of the magnetic body 432 while having a predetermined slope with reference to the upper surface of the magnetic body 432. However, the flat type nonmagnetic body 431 is horizontally formed over the indented portion and on the marginal portion of the indented upper surface of the nonmagnetic body 432.

Figure 7E:
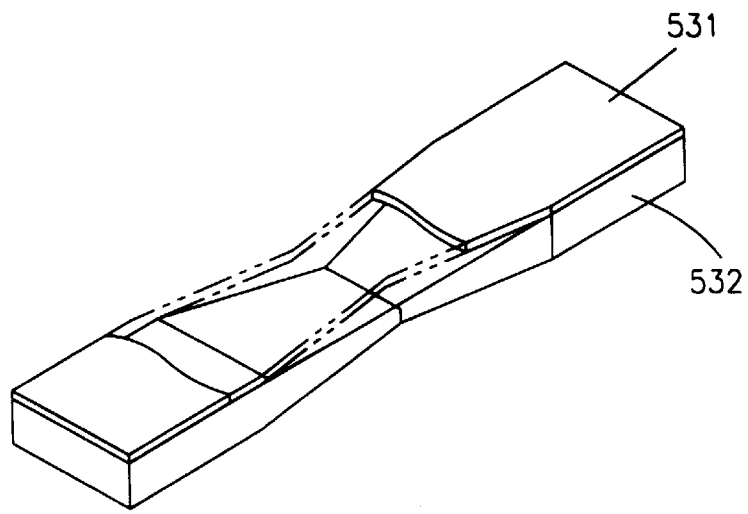
FIG. 7E is a perspective view of a linear motor moveable unit according to a fifth embodiment of the present invention.

With reference to FIG. 7E illustrating the fifth embodiment of the moveable unit according to the present invention, the moveable unit 30 modified from the third embodiment in FIG. 7C for the convenience of its fabrication includes a nonmagnetic body 531 and a magnetic body 532, wherein the magnetic body 532 becomes smaller in thickness toward a central lower portion of the magnetic body 532 while having a predetermined slope with reference to the upper surface of the magnetic body 532. However, the flat type nonmagnetic body 531 is horizontally formed over the indented portion and on the marginal portion of the indented upper surface of the nonmagnetic body 532.

Figure 8A:
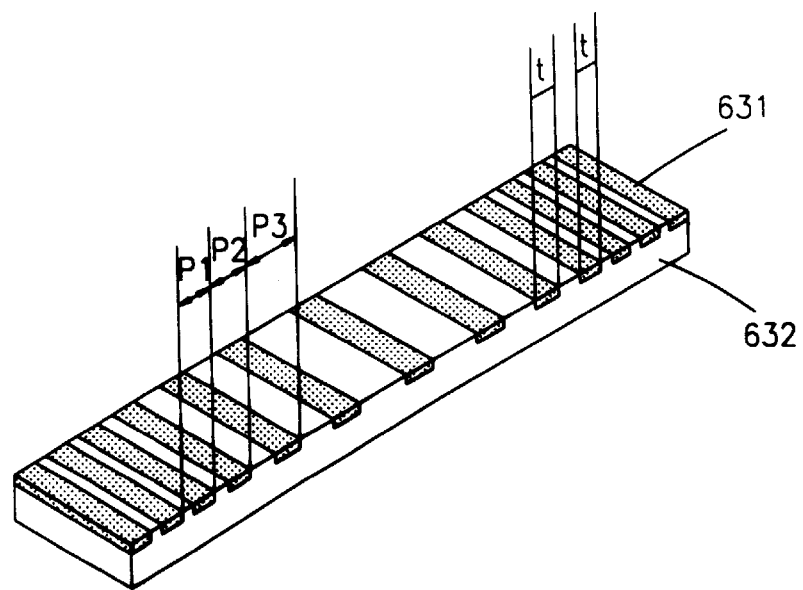
FIG. 8A is a perspective view of a linear motor moveable unit according to a sixth embodiment of the present invention.

As shown in FIG. 8A illustrating the sixth embodiment of the moveable unit according to the present invention, the moveable unit 30 includes a magnetic body 632 and a plurality of nonmagnetic body bars 631 widthwardly pressed parallel with each other in the upper surface of the magnetic body 632, wherein each of the plurality of nonmagnetic body bars 631 has a predetermined width t, and respective pitches $P_1$, $P_2$, $P_3$ between the respective bars 631 become gradually smaller from the center toward each edge portion of the moveable unit 30.

The moveable unit 30 according to the sixth embodiment of the present invention obtains a required thrust force by shifting respective magnetic flux areas formed by the nonmagnetic body bars 631 when the moveable unit 30 crosses parallel with the coil unit 9 in FIG. 4A.

Figure 8B:
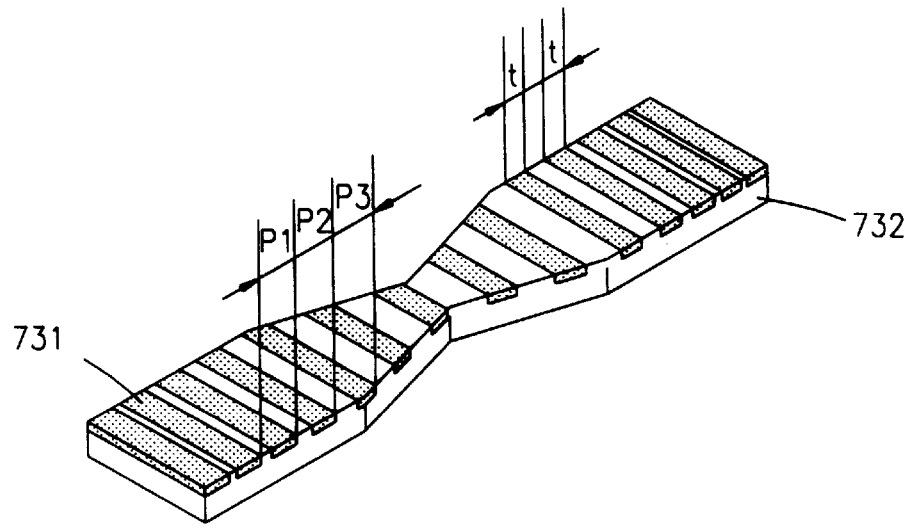
FIG. 8B is a perspective view of a linear motor moveable unit according to a seventh embodiment of the present invention.

Also, as shown in FIG. 8B illustrating the seventh embodiment of the moveable unit according to the present invention, the moveable unit 30 includes a magnetic body 732 and a plurality of nonmagnetic body bars 731 obtained by widthwardly indenting a central portion of the moveable unit 30 according to the sixth embodiment of the present invention from each side thereof.

Under the adoption of the moveable unit 30 according to the seventh embodiment of the present invention, the linear motor 100 allows its thrust force to be applicable to a relatively abrupt speed variation by shifting respective magnetic flux areas formed by the nonmagnetic body bars 731 when the moveable unit 30 crosses parallel with the coil unit.

Figure 8C:
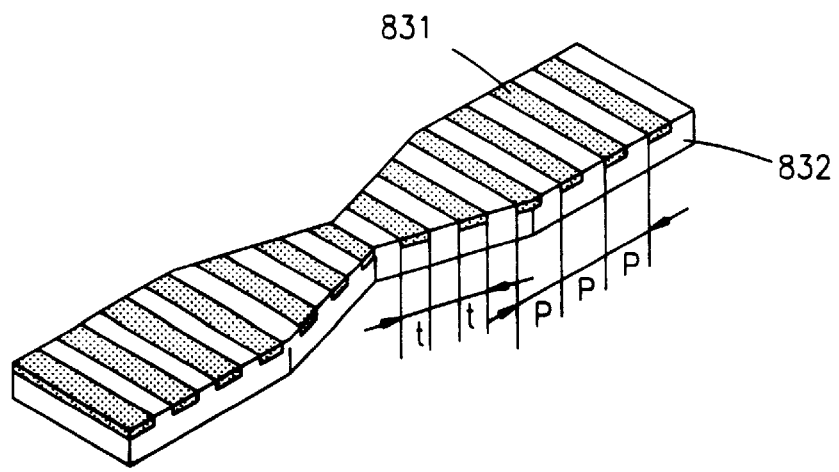
FIG. 8C is a perspective view of a linear motor moveable unit according to an eighth embodiment of the present invention.

As further shown in FIG. 8C illustrating the eighth embodiment of the moveable unit according to the present invention, the moveable unit 30 includes a magnetic body 832 and a plurality of nonmagnetic body bars 831 obtained by widthwardly indenting a central portion of the moveable unit 30 according to the sixth embodiment of the present invention from each side thereof, wherein the respective nonmagnetic body bars 831 are regularly aligned in the upper surface of the magnetic body 832 with the same pitches P and widths t therebetween.

The moveable unit 30 according to the eighth embodiment of the present invention realizes a thrust force variation for a linear motor by shifting respective magnetic flux areas formed by the nonmagnetic body bars 831 when the moveable unit 30 crosses parallel with the coil unit.

Figure 9:
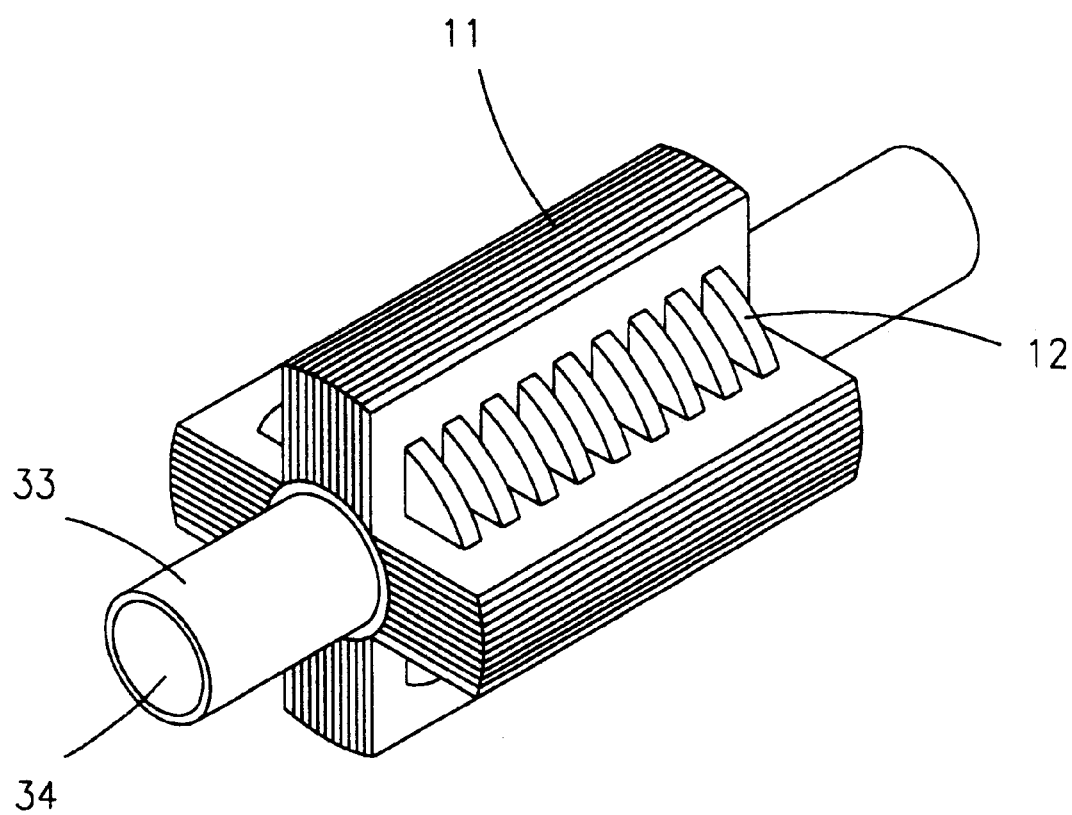
FIG. 9 is a perspective view illustrating a state in which a cylindrical moveable unit is combined with a coil unit of a linear motor according to the present invention.

With reference to FIG. 9 illustrating a modified linear motor according to the present invention, the moveable unit 30 includes a circular magnetic body 34 and a nonmagnetic body 33 formed surrounding the circular magnetic body 34, whereby the moveable unit 30 moves through a cylindrical coil unit 11 including a core laminations 12.

Figure 10A:
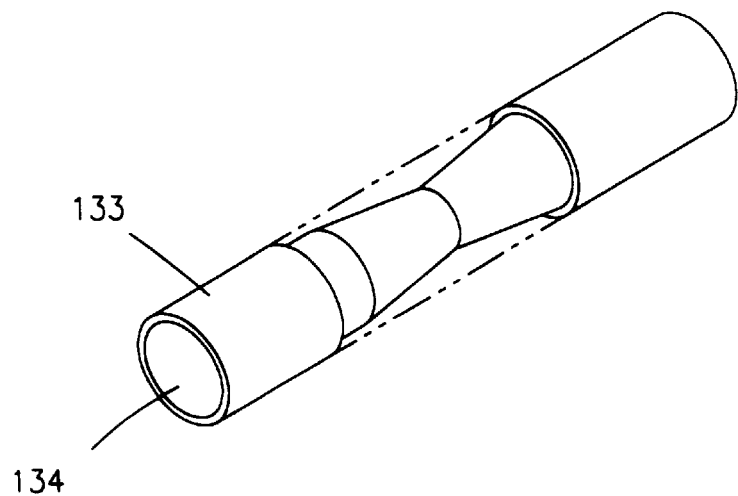
FIG. 10A is a perspective view illustrating a moveable unit of a linear motor according to a ninth embodiment of the present invention.

As shown in FIG. 10A illustrating the ninth embodiment of the moveable unit according to the present invention, the moveable unit 30 includes a circular magnetic body 134 and a nonmagnetic body 133 surrounding the circular magnetic body 134. Therein, the circular magnetic body 134 becomes indented in order to make it smaller toward a central portion thereof in diameter, and the nonmagnetic body 133 is fillingly formed on and along the outer periphery of the magnetic body 134. The moveable unit 30 according to the eighth embodiment of the present invention realizes a thrust force for a linear motor by shifting respective magnetic flux areas formed when the moveable unit 30 moves through the coil unit 9 while crossing the core laminations 12 of the coil unit 9.

Figure 10B:
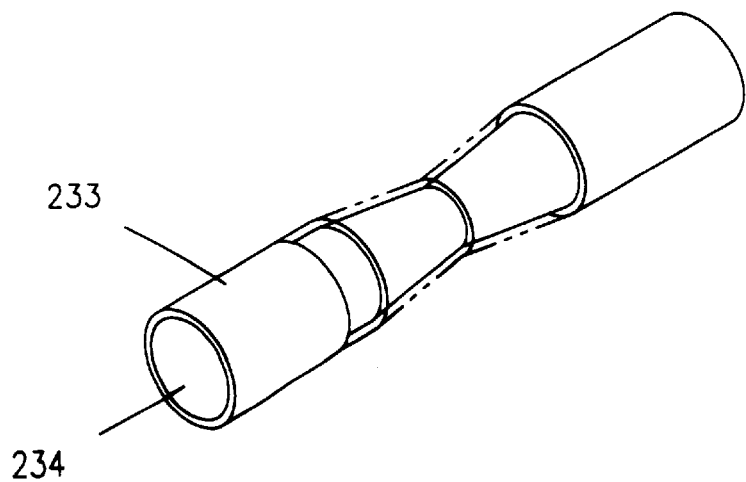
FIG. 10B is a perspective view illustrating a moveable unit of a linear motor according to a tenth embodiment of the present invention.

As further shown in FIG. 10B illustrating the tenth embodiment of the moveable unit according to the present invention, the moveable unit 30 includes a circular magnetic body 234 and a nonmagnetic body 233 surrounding the circular magnetic body 134. Therein, the circular magnetic body 234 becomes indented in order to make it smaller toward a central portion thereof in diameter, and the nonmagnetic body 233 is formed on and along the outer periphery of the magnetic body 234, wherein the nonmagnetic body 233 is identically formed on the magnetic body 234 in thickness.

Figure 10C:
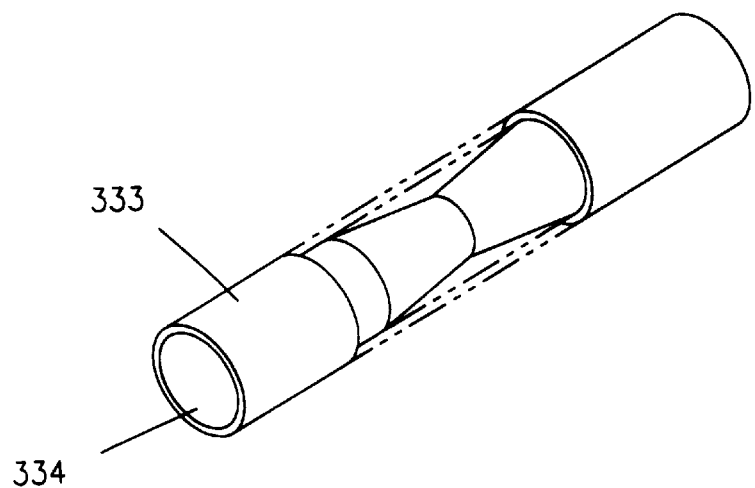
FIG. 10C is a perspective view illustrating a moveable unit of a linear motor according to an eleventh embodiment of the present invention.

Also, as shown in FIG. 10C illustrating the eleventh embodiment of the moveable unit according to the present invention, the moveable unit 30 includes a circular magnetic body 334 and a nonmagnetic body 333 surrounding the circular magnetic body 334. Therein, the circular magnetic body 334 becomes indented in order to make its diameter smaller toward a central portion thereof, and the nonmagnetic body 333 is cylindrically formed along the outer periphery of the magnetic body 334 for thereby obtaining an opening between the indented portion of the magnetic body 334 and the cylindrical magnetic body 333.

Figure 10D:
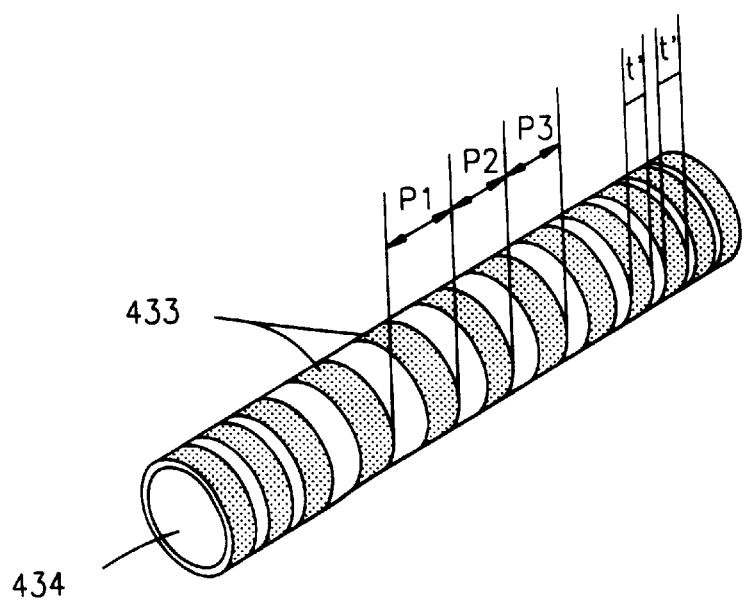
FIG. 10D is a perspective view illustrating a moveable unit of a linear motor according to a twelfth embodiment of the present invention.

As shown in FIG. 10D illustrating the twelfth embodiment of the moveable unit according to the present invention, the moveable unit 30 includes a circular magnetic body 434 and a plurality of nonmagnetic body rings 432 pressed in the upper surface of the circular magnetic body 434, wherein each of the plurality of nonmagnetic body rings 432 has a predetermined width t', and respective pitches $P_1$, $P_2$, $P_3$ between the nonmagnetic body rings 432 become gradually smaller from the center toward each edge portion of the moveable unit 30 ($P_1 < P_2 < P_3$).

The moveable unit 30 according to the twelfth embodiment of the present invention obtains a required thrust force by shifting respective magnetic flux areas formed by the nonmagnetic body rings 433 when the moveable unit 30 moves through the cylindrical coil unit 9.

Figure 10E:
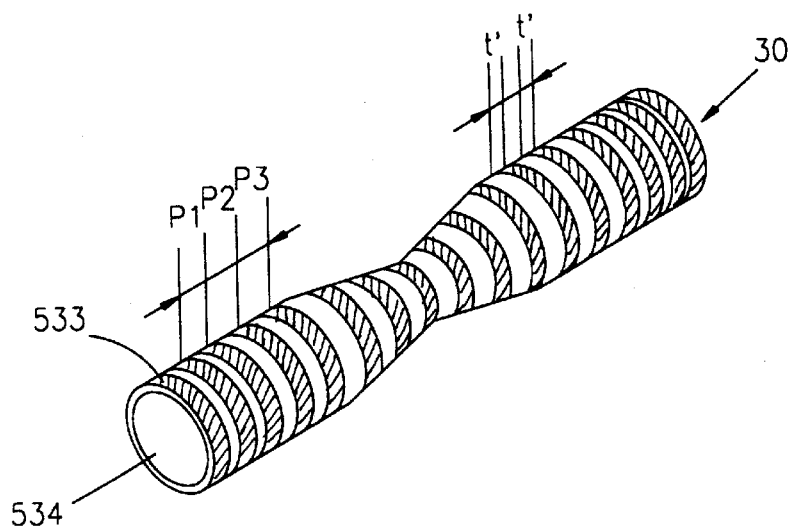
FIG. 10E is a perspective view illustrating a moveable unit of a linear motor according to a thirteenth embodiment of the present invention.

Also, as shown in FIG. 10E illustrating the thirteenth embodiment of the moveable unit according to the present invention, the moveable unit 30 according to the twelfth embodiment includes a circular magnetic body 534 and a plurality of nonmagnetic body rings 533 and becomes radially coned toward the central portion thereof, wherein each of the plurality of nonmagnetic body rings 533 has a predetermined width t', and respective pitches $P_1$, $P_2$, $P_3$ between the nonmagnetic body rings 533 become gradually smaller from the center toward each edge portion of the moveable unit 30 ($P_1 < P_2 < P_3$).

Figure 10F:
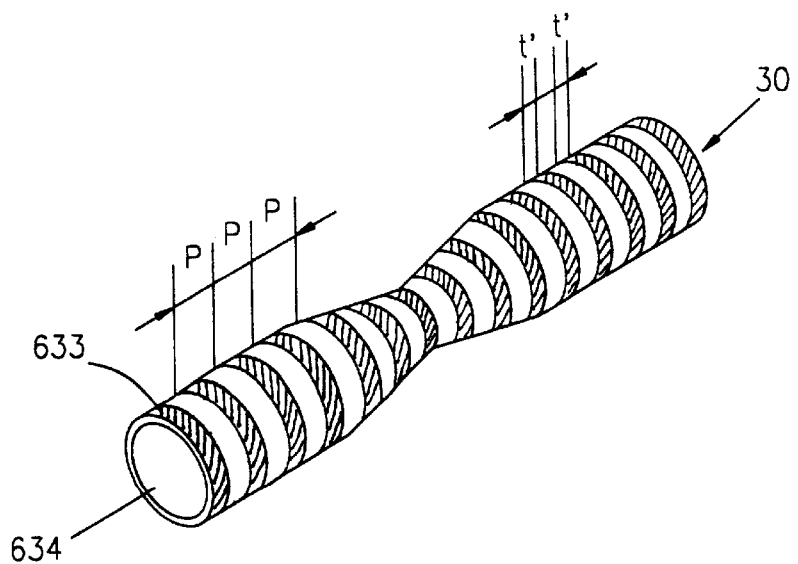
FIG. 10F is a perspective view illustrating a moveable unit of a linear motor according to a fourteenth embodiment of the present invention.

As shown in FIG. 10F illustrating the fourth embodiment of the movement unit according to the present invention, the moveable unit 30 according to the twelfth embodiment includes a circular magnetic body 634 and a plurality of nonmagnetic body rings 633 and becomes radially coned toward the central portion thereof, wherein each of the plurality of nonmagnetic body rings 633 has a predetermined width t', and respective pitches P are formed identically to each other between the nonmagnetic body rings 633.

An elevator system will be taken as an exemplary system that employs the thusly constituted linear motor according to the present invention will now be described.

Figure 11:
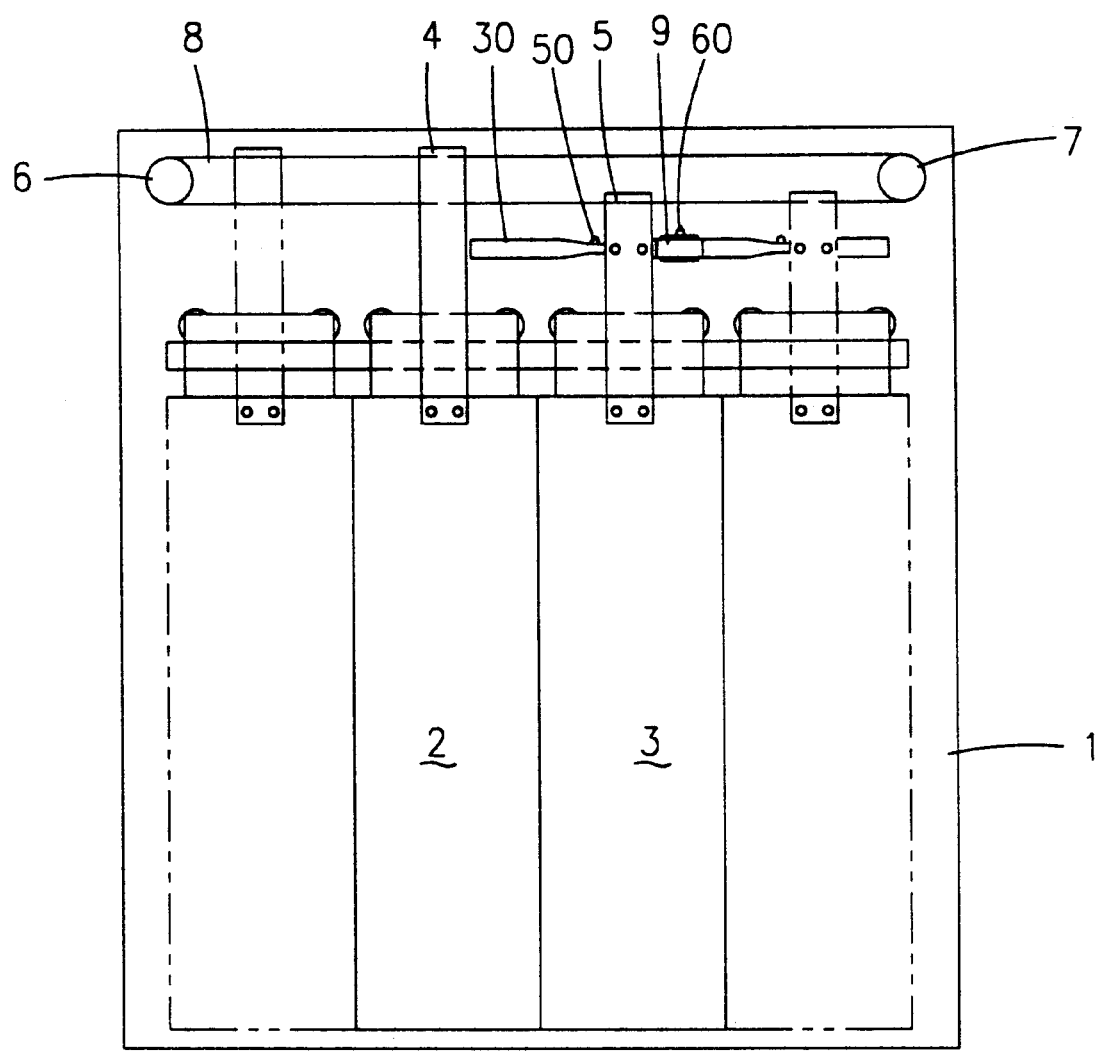
FIG. 11 is a front view of an elevator system including the linear motor according to the present invention.

First, as shown in FIG. 11, in an elevator body 1 of the elevator system employing the linear motor according to the present invention, respective lower end portions of a left and right side power transfer plates 4, 5 are fixedly connected to corresponding upper portions of a left and right doors 2, 3 which serve to open/close the elevator body 1.

A rotation rope 8 that circulates between auxiliary pulleys 6, 7 formed at each side portion of the elevator body 1 is fixedly connected to an upper portion of each of the power transfer plates 4, 5 so as to horizontally move therealong.

Here, by shifting the direction of a thrust force generation for the linear motor 100, its operation speed becomes decreased when the cam 50 formed on an upper central portion of the moveable unit 30 drives the limit switch 60 which is fixed to the upper surface of the coil unit 9 during a rightward movement of the moveable unit 30.

Figure 12A:
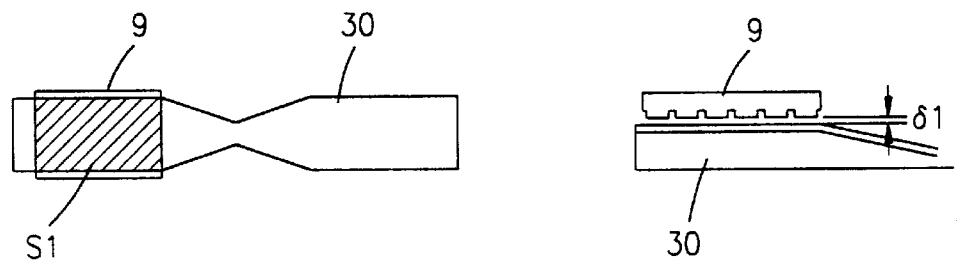
FIG. 12A is a composition view including a plan view and a side view respectively illustrating a relation between a magnetic flux area and a clearance magnitude, in a state in which a linear motor moveable unit begins moving toward a right side and its front portion of the moveable unit arrives at a coil unit of the linear motor according to the present invention.
Figure 12B:
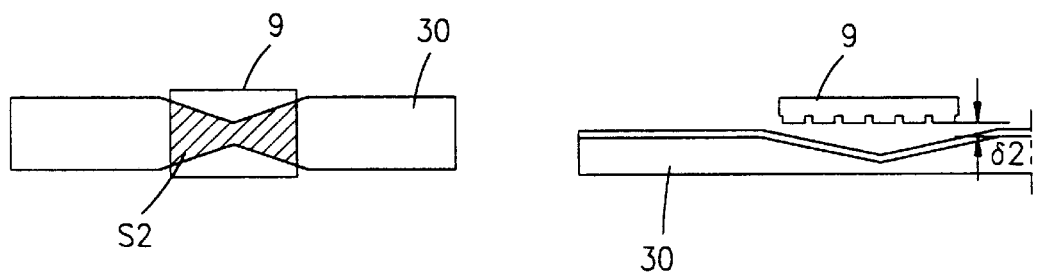
FIG. 12B is a composition view including a plan view and a side view respectively illustrating a relation between a magnetic flux area and a clearance magnitude, in a state in which a linear motor moveable unit begins moving toward a right side and its mid portion of the moveable unit arrives at a coil unit of the linear motor according to the present invention.
Figure 12C:
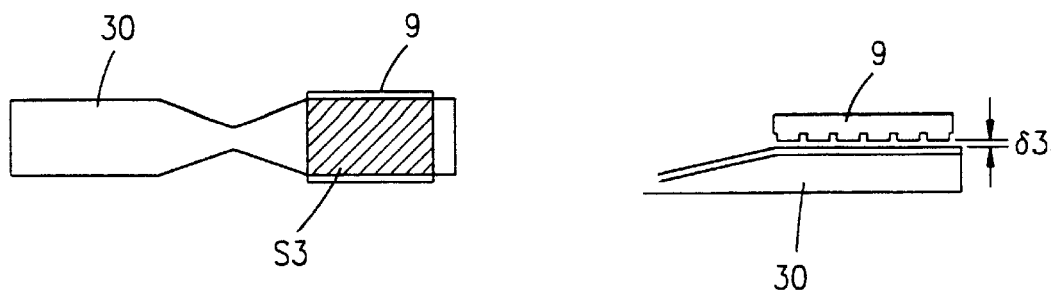
FIG. 12C is a composition view including a plan view and a side view respectively illustrating a relation between a magnetic flux area and a clearance magnitude, in a state in which a linear motor moveable unit begins moving toward a right side and its rear portion of the moveable unit arrives at a coil unit of the linear motor according to the present invention.

FIGS. 12A through 12C illustrate respective states of variation with regard to the respective magnetic flux areas $S_1$, $S_2$, $S_3$, and clearances $\delta_1$, $\delta_2$, $\delta_3$, between the moveable unit 30 and the coil unit 9.

Figure 13:
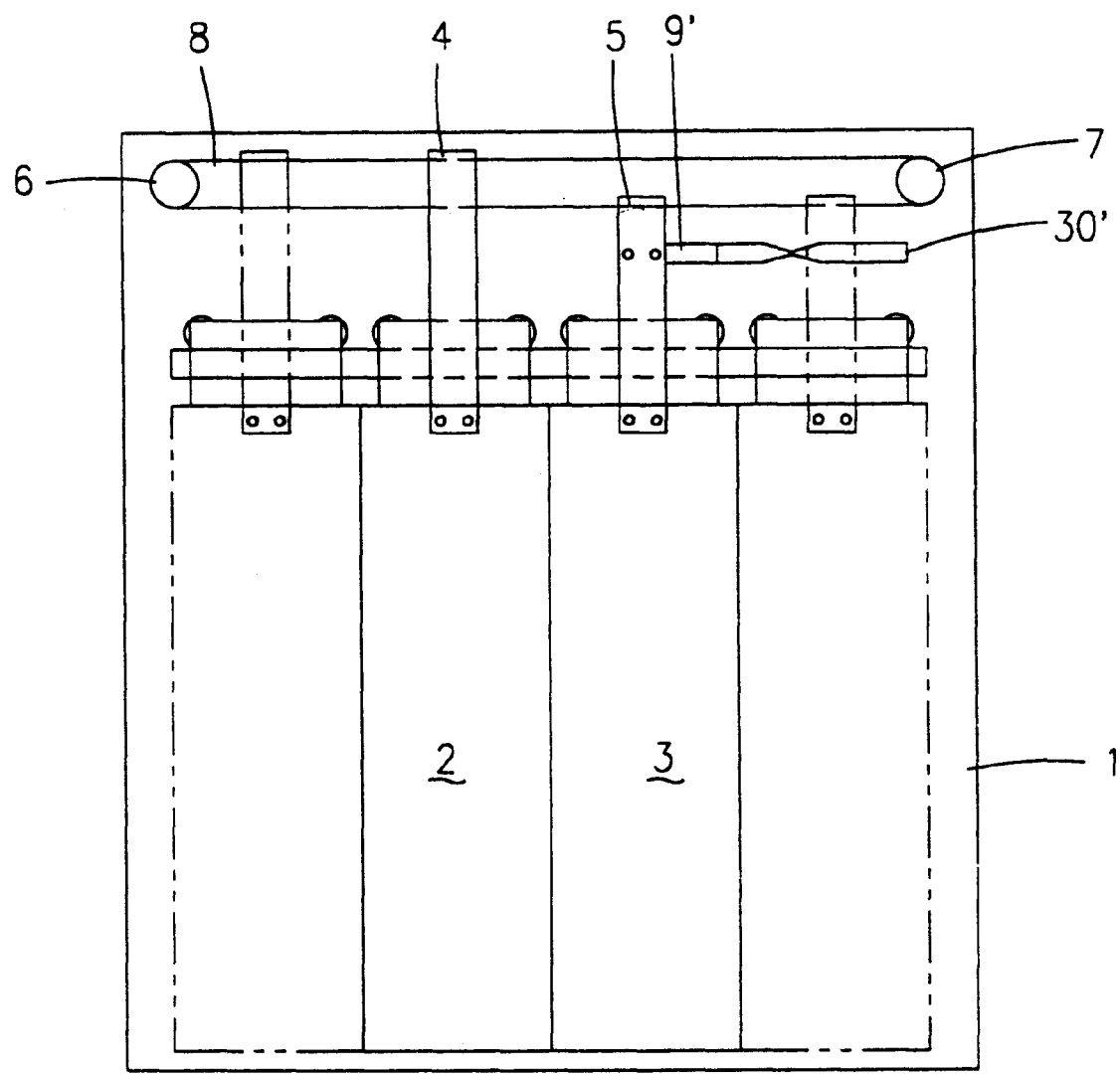
FIG. 13 is a front view of another elevator system including a linear motor according to the present invention.

Meanwhile, as shown in FIG. 13 illustrating another exemplary view of an elevator system adopting the linear motor according to the present invention, a moveable unit 30' is fixed to a portion of the elevator body 1, and a coil unit 9' is provided at the right side power transfer plate 5, so that the linear motor coil unit 9' carries out its moveable as the right side power transfer plate 5 moves toward the right side. Therein, the operation and effects are identical to that of FIG. 11 and accordingly its description will be omitted.

As described above, the linear motor according to the present invention obtains its required thrust force by shifting a clearance between the moveable unit and the coil unit, and a magnetic flux area formed around the moveable unit in cooperation with the coil unit, thereby enabling a speed control without an electrical current in its applied system such as an elevator.

Further, because an additional current control system is not required with the provision of the present invention, there are obtained a cost reduction and an increased productivity.

As the present invention may be embodied in several forms without departing from the spirit of essential characteristics thereof, it should also be understood that the present embodiment is not limited by any of the details of the foregoing description, unless otherwise specified, but rather be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A linear motor comprising:
    a stator including a coil unit having a plurality of core laminations therein;
    a moveable unit including a planar magnetic body facing said coil unit and having a varying width and thickness for forming a varying clearance between said magnetic body and said coil unit and for varying a magnetic flux area there between; and
    a planar nonmagnetic body positioned on an upper surface of said magnetic body.

2. The linear motor according to claim 1, wherein said magnetic body becomes thinner in thickness toward a central longitudinal portion thereof.

3. The linear motor according to claim 1, wherein said magnetic body and said nonmagnetic body become narrower in width toward a central longitudinal portion thereof, respectively.

4. The linear motor according to claim 1, wherein said magnetic body and said nonmagnetic body become thinner in thickness and narrower in width toward a central longitudinal portion thereof, respectively.

5. A linear motor comprising:
    a stator including a coil unit having a plurality of core laminations therein;
    a moveable unit including a planar magnetic body facing said coil unit; and
    a plurality of nonmagnetic bars each having a predetermined width and being positioned on an upper surface of said magnetic body with a varying distance between one another for varying a magnetic flux area between said coil unit and said magnetic body.

6. The linear motor according to claim 5, wherein the closer to a central longitudinal portion of said magnetic body, the greater said distance between said nonmagnetic bars.

7. The linear motor according to claim 5, wherein said magnetic body becomes narrower in width toward a central longitudinal portion thereof.

8. A linear motor comprising:
    coil unit;
    a moveable unit including a cylindrical magnetic body facing said coil unit and having a varying diameter for forming a varying clearance between said magnetic body and said coil unit and for varying a magnetic flux area therebetween; and a nonmagnetic body surrounding an outer periphery of said magnetic body.

9. The linear motor according to claim 8, wherein said magnetic body becomes smaller in diameter toward a central longitudinal portion thereof, and said nonmagnetic body is formed on the outer periphery of said magnetic body.

10. The linear motor according to claim 8, wherein said magnetic body and said nonmagnetic body become smaller in diameter toward a central longitudinal portion thereof, respectively.

11. A linear motor comprising:

a coil unit;

a moveable unit including a cylindrical magnetic body facing said coil unit and having a varying diameter for forming a varying clearance between said magnetic body and said coil unit and for varying a magnetic flux area therebetween; and a tubular nonmagnetic body surrounding an outer periphery of said magnetic body.

12. The linear motor according to claim 11, wherein said magnetic body becomes smaller in diameter toward a central longitudinal portion thereof, and said nonmagnetic body is provided along the outer periphery of said magnetic body.

13. A linear motor comprising:

a coil unit;

a moveable unit including a cylindrical magnetic body facing said coil unit and a plurality of nonmagnetic rings each being positioned on an outer surface of said magnetic body with a different distance between one another for varying a magnetic flux area between said coil unit and said magnetic body.

14. The linear motor according to claim 13, wherein the closer to a central longitudinal portion of the magnetic body, the greater said distance between said nonmagnetic rings.

15. The linear motor according to claim 13, wherein said magnetic body becomes smaller in diameter toward a central portion thereof, and the closer to a central longitudinal portion of said magnetic body, the greater said distance between said nonmagnetic rings.

16. The linear motor according to claim 13, wherein said magnetic body becomes smaller in diameter toward a central longitudinal portion thereof, and said distance between said nonmagnetic rings is the same.

17. In an elevator system including left and right side power transfer plates fixedly connected to corresponding upper portions of left and right doors of an elevator body, a rotation rope enabling said left or right side power transfer plates to become operational, a pair of pulleys formed at each side portion of said elevator body so that said rotation rope rotates thereon, a coil unit provided at a portion of said elevator body, and a moveable unit provided with a magnetic body and a nonmagnetic body, a linear motor, wherein said coil unit is fixed to a portion of said elevator body, and said moveable unit is fixed to either of said left or right side power transfer plates.

18. In an elevator system including left and right side power transfer plates fixedly connected to corresponding upper portions of left and right doors of an elevator body, a rotation rope enabling said left and right side power transfer plates to become operational, a pair of pulleys formed at each side portion of said elevator body so that said rotation rope rotates thereon, a coil unit provided at a portion of said elevator body, and a moveable unit provided with a magnetic body and a nonmagnetic body, a linear motor, wherein said moveable unit is fixed to a portion of said elevator body, or said coil unit is fixed to either of said left and right side power transfer plates.

19. A linear motor comprising:

a stator including a coil unit having a plurality of core laminations therein;

a moveable unit including a planar magnetic body facing said coil unit and having a varying width for varying a magnetic flux area therebetween; and a plurality of nonmagnetic bars each having a predetermined width and being positioned on an upper surface of said magnetic planar body at a varying distance apart from one another for varying a magnetic flux area between said coil unit and magnetic body.

20. The linear motor according to claim 19, wherein said magnetic body becomes narrower in width toward a central longitudinal portion thereof, and the closer to the central longitudinal portion of said magnetic body, the greater the distance between said nonmagnetic bars.

21. A linear motor comprising:

a coil unit;

a moveable unit including a cylindrical magnetic body facing said coil unit and having a varying diameter; and a plurality of nonmagnetic rings each being positioned on an outer surface of said magnetic body at a varying distance apart from one another for varying a magnetic flux area between the coil unit and magnetic body.

22. The linear motor according to claim 21, wherein said magnetic body becomes smaller in diameter toward a central longitudinal portion thereof, and the closer to the central longitudinal portion of said magnetic body, the greater the distance between said nonmagnetic rings.

* * * * *